United States Patent
Cazes et al.

(10) Patent No.: US 9,828,034 B2
(45) Date of Patent: Nov. 28, 2017

(54) VEHICLE BODYWORK STRUCTURE DEVICE

(71) Applicant: AUTOTECH ENGINEERING A.I.E., Amorebieta-Etxano (ES)

(72) Inventors: Christophe Cazes, Versailles (FR); Grégory Gatard, Leuville-sur-Orge (FR); Vincent Barelli, La Ville du Bois (FR); Xavier Delgerie, Le Plessis Robinson (FR)

(73) Assignee: AUTOTECH ENGINEERING A.I.E., Amorebieta-Etxano (ES)

( * ) Notice: Subject to any disclaimer, the term of this patent is extended or adjusted under 35 U.S.C. 154(b) by 0 days.

(21) Appl. No.: 15/112,410

(22) PCT Filed: Jan. 20, 2015

(86) PCT No.: PCT/EP2015/051038
§ 371 (c)(1),
(2) Date: Jul. 18, 2016

(87) PCT Pub. No.: WO2015/107227
PCT Pub. Date: Jul. 23, 2015

(65) Prior Publication Data
US 2016/0332673 A1   Nov. 17, 2016

(30) Foreign Application Priority Data

Jan. 20, 2014   (FR) ...................................... 14 50441

(51) Int. Cl.
*B62D 25/04* (2006.01)

(52) U.S. Cl.
CPC ..................... *B62D 25/04* (2013.01)

(58) Field of Classification Search
CPC ................................................. B62D 25/04
(Continued)

(56) References Cited

U.S. PATENT DOCUMENTS 5,613,727 A   3/1997   Yamazaki
5,938,275 A   8/1999   Kleinhans et al.
(Continued)

FOREIGN PATENT DOCUMENTS

DE   10037494 A1   3/2001
DE   10007358 A1   8/2001
(Continued)

OTHER PUBLICATIONS

International Search Report and Written Opinion for PCT/EP2015/051038, dated Aug. 11, 2015, 12 pp.
(Continued)

*Primary Examiner* — Dennis H Pedder
(74) *Attorney, Agent, or Firm* — Squire Patton Boggs (US) LLP

(57) ABSTRACT

A motor vehicle bodywork beam including a main reinforcement having a bottom, two side walls and two flanges substantially parallel to the bottom and a secondary reinforcement. The secondary reinforcement is fixed to the main reinforcement. The main reinforcement and secondary reinforcement are fixed at each side wall level, and of the side walls and/or bottom of the main and/or secondary reinforcement comprise a transition, such that at least a part of the bottom of the secondary reinforcement is in contact with a part of the bottom of the main reinforcement. The bodywork beam has at least one closed cell formed by the main reinforcement and a secondary reinforcement, and the cell has four linear segments formed by the main reinforcement and/or secondary reinforcement, three linear segments covering at least 50% of the corresponding dimension of the cell, so that two segments are oriented transversely to the bottom of the main reinforcement, and the other two segments are substantially perpendicular to said two first segments.

12 Claims, 12 Drawing Sheets

(58) Field of Classification Search
USPC .................................................. 296/193.06
See application file for complete search history.

(56) References Cited

U.S. PATENT DOCUMENTS

| | | |
|---|---|---|
| 6,679,540 B1 | 1/2004 | Graber et al. |
| 2001/0024054 A1 | 9/2001 | Mikuni |
| 2002/0033618 A1* | 3/2002 | Kwon .................... B62D 25/04 |
| | | 296/203.03 |
| 2005/0285416 A1 | 12/2005 | Heatherington et al. |
| 2009/0085379 A1 | 4/2009 | Takahashi et al. |
| 2012/0119477 A1 | 5/2012 | Kim |
| 2013/0020833 A1 | 1/2013 | Yao |

FOREIGN PATENT DOCUMENTS

| | | |
|---|---|---|
| EP | 1190938 A2 | 3/2002 |
| EP | 1498345 A2 | 1/2005 |
| GB | 2497396 A | 6/2013 |
| JP | 2001151151 A | 6/2001 |
| WO | WO 2008/037350 A1 | 4/2008 |

OTHER PUBLICATIONS

Translation of International Search Report for PCT/EP2015/051038, dated Aug. 11, 2015, 3 pp.

* cited by examiner

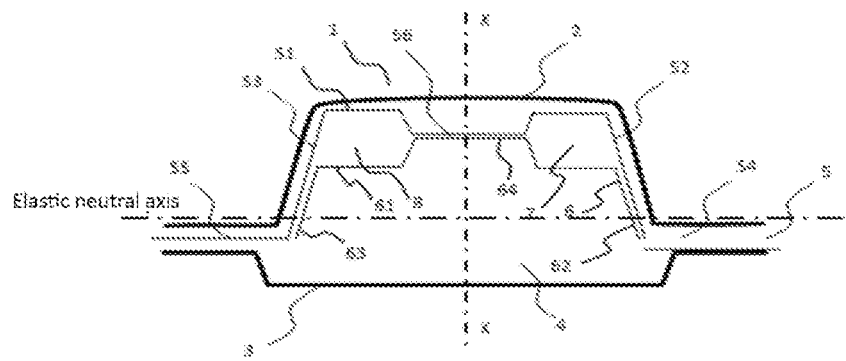
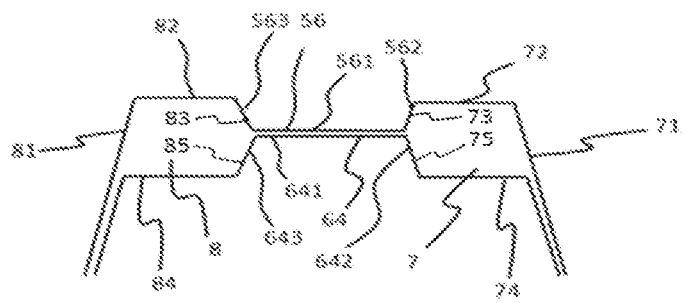
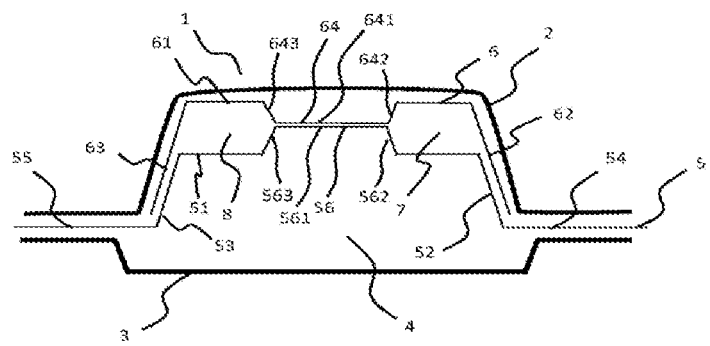

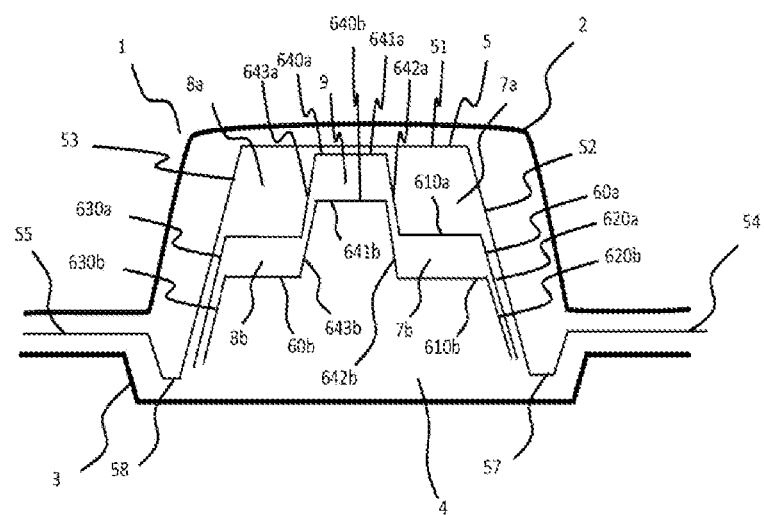
FIG 9
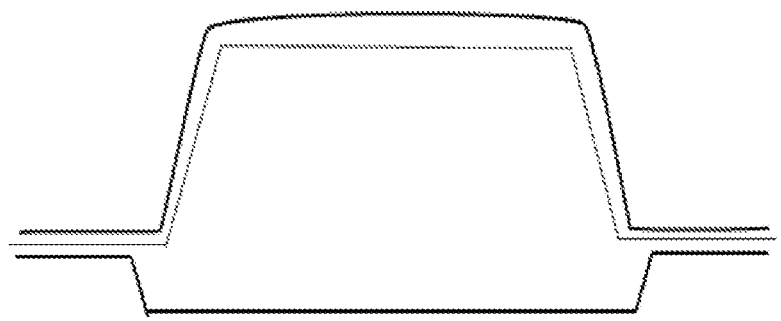
FIG 10: STATE OF THE ART

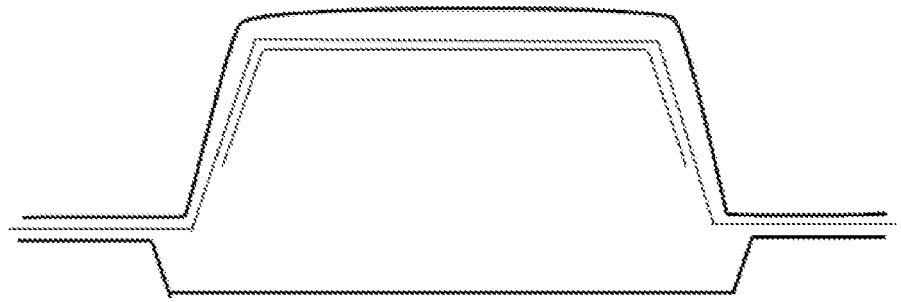
FIG 10a: STATE OF THE ART
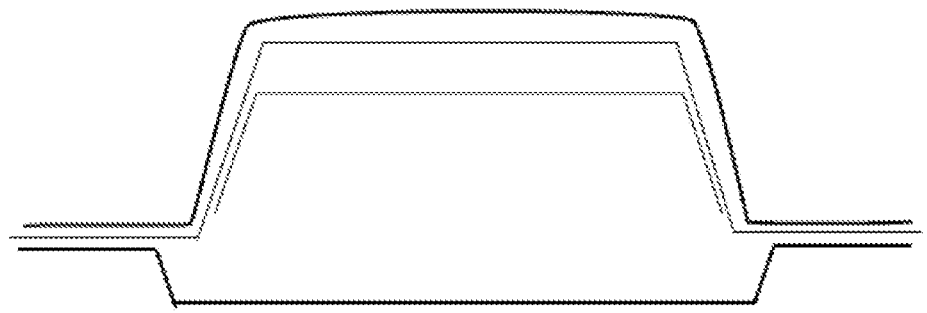
FIG 10b: STATE OF THE ART
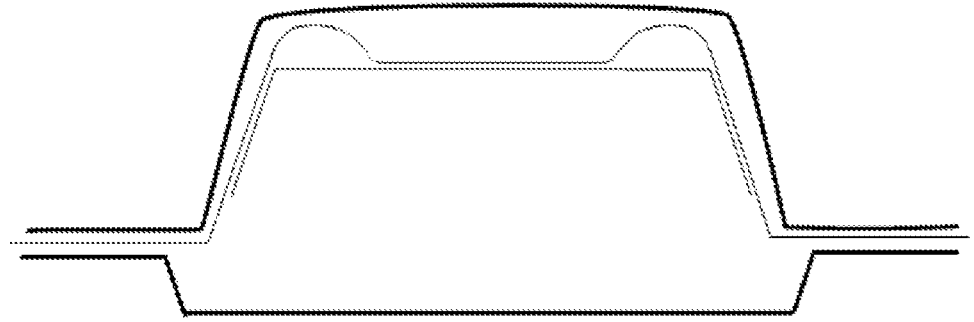
FIG 10c: STATE OF THE ART

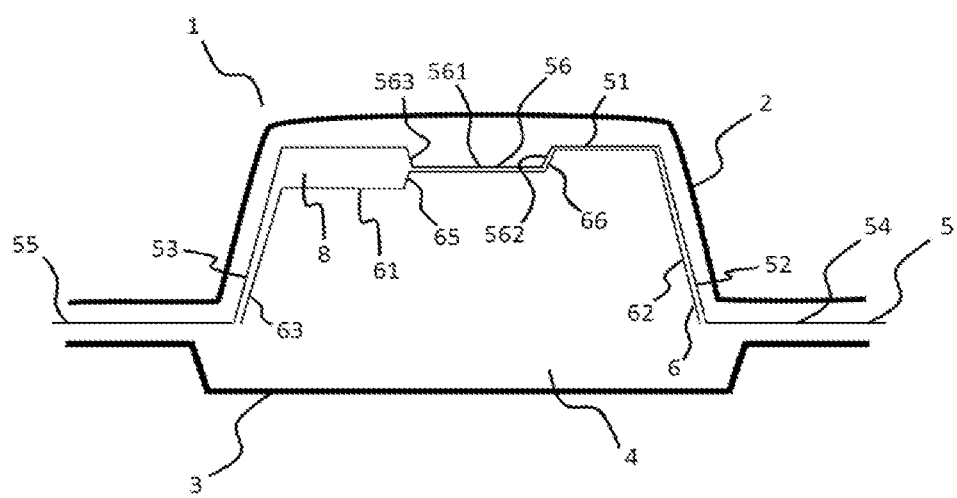
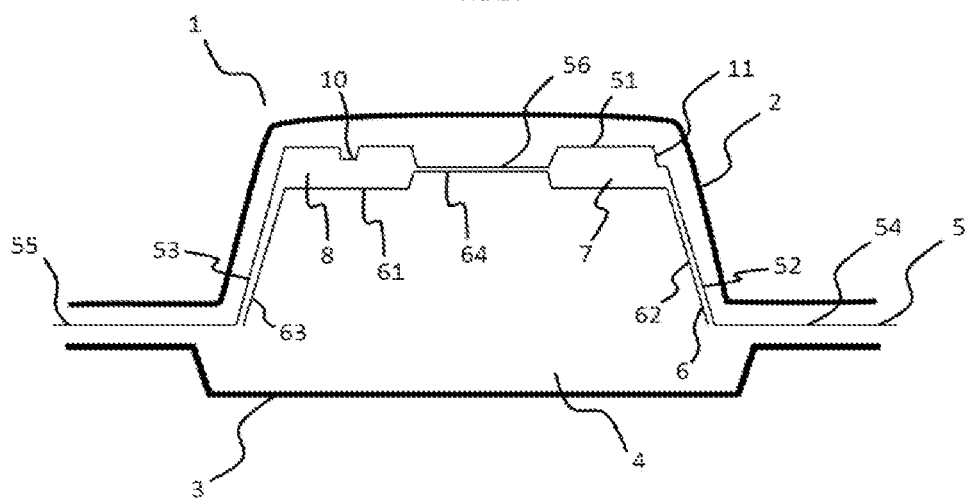

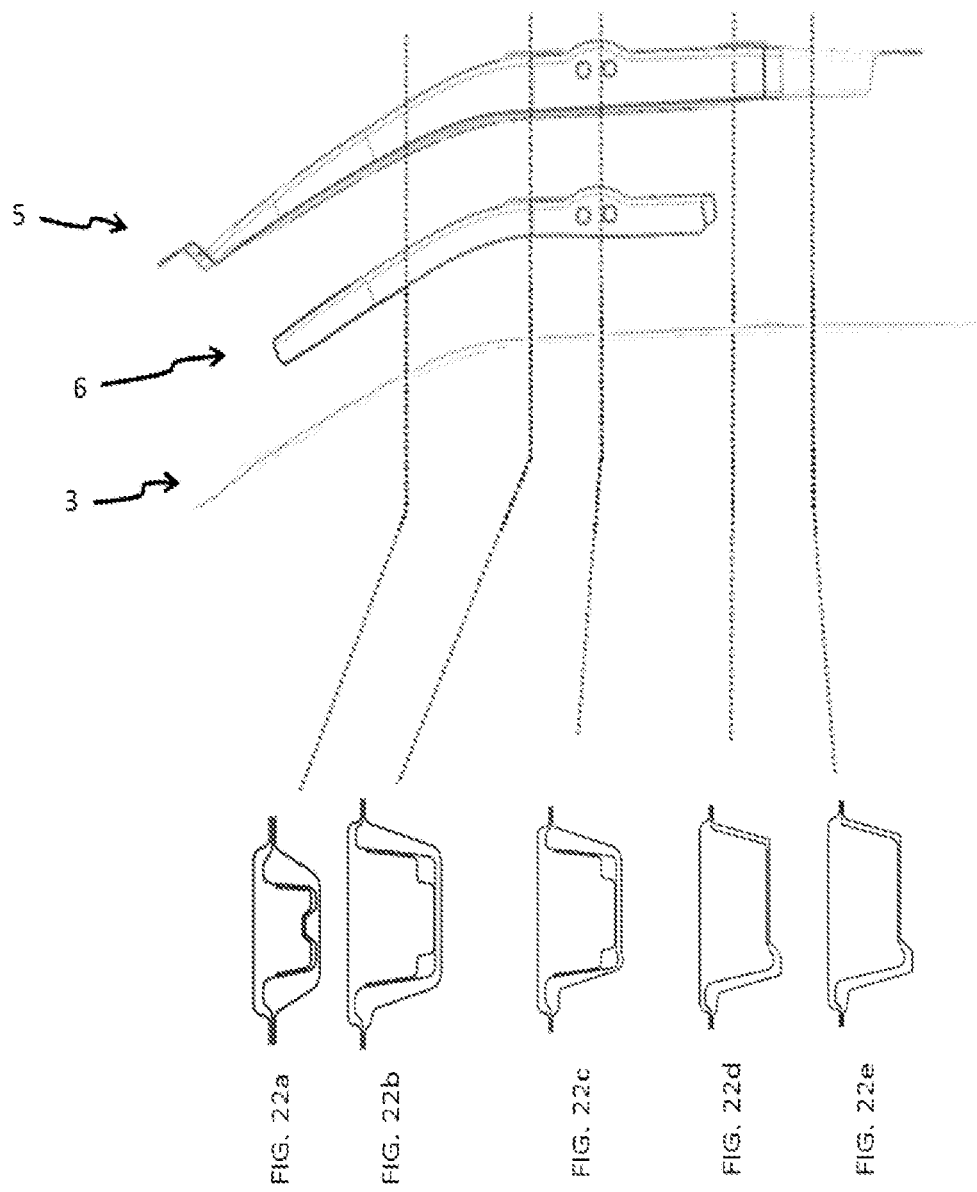

VEHICLE BODYWORK STRUCTURE DEVICE

FIELD OF THE INVENTION

The present invention relates to the field of metal parts involved in the production of a metal framework, in particular a vehicle's chassis or bodywork.

STATE OF THE ART

Many metal beams for vehicles' bodywork have already been made.

The document EP2066549, for example, is already known, which describes a beam for vehicle bodywork having a reinforcement comprising a first hat-shaped element having a grooved bottom, two side walls each connected to one end of the grooved bottom, and two flanges each connected to an end of a side wall. This first element is fixed to a second U-shaped element provided with a shallow grooved, bottom, which is fixed at its groove to the groove of the bottom of the first element. Each of the second element's bottom ends is connected to a side wall that is fixed to the side wall of the first element to which it is juxtaposed.

Also known is document EP1498345 that describes a beam for vehicle bodywork. The beam comprises two elements which are arranged along the length of the beam and which are provided to ensure the resistance to bending in the direction of the length of the beam that would be created by applying a transverse force to the beam, typically in the collision between several vehicles. The beam also includes a U-shaped reinforcement, which is connected at its side walls to the elements.

Also known are the documents JP2001151151 and US20090085379, which both describe beams for vehicle bodywork having over their entire length a honeycomb-like structure formed by longitudinal reinforcements and transverse reinforcements.

Also known is document US2005285416, which describes a bumper made of a hat-shaped top part, the bottom of which is grooved, and a hat-shaped reinforcement. The reinforcement is fitted into the top part so that the bottom of the reinforcement is fixed to the bottom at the groove level, wherein the reinforcement is not in contact with the side walls of the top part.

Also known are different types of beam structures described in GB 2 497 396, DE 100 37 494, U.S. Pat. No. 5,613,727, US 2012/119477, U.S. Pat. No. 5,938,275 and US 2001/024054.

Also known is the bodywork beam shown in cross-sectional view in FIG. 10. This beam consists of one hat-shaped outer panel and a hat-shaped inner panel. The concavities of the outer panel and of the inner panel are directed such that there is an inner space between the outer panel and the inner panel. Between the outer panel and the inner panel a hat-shaped main reinforcement is arranged. Welds are made at the level of each of the two flanges of the outer panel, of the inner panel and of the main reinforcement in order to fix them together. A rib is formed on the bottom of the main reinforcement. A U-shaped secondary reinforcement, whose bottom is grooved, is fitted into the main reinforcement, so that it is permanently in contact with the main reinforcement. Welds are made in each side wall and on the bottom of the groove of the main and secondary reinforcements so as to fix them together.

All the solutions described above do not provide sufficient strength and stiffness to the beam and also do not create areas where deformation is expected during the application of a compressive force on the beam as well as a bending force caused by this compression, typically during a collision between several vehicles, to ensure the safety of people inside the vehicles.

Also known is document EP1190938, which discloses a beam for vehicle bodywork comprising two reinforcements. The first reinforcement consists of a first hat-shaped element connected to a second U-shaped element. The elements are connected by partial fitting of the second element in the first element. The second reinforcement consists of a U-shaped element, which is fitted into the hat-shaped inner part, the bottom of which is grooved. The beam is partially filled with a hard resin in order to increase the stiffness of the structure. This solution poses the problem of offering too much stiffness, which does not allow for the creation of areas where deformation is expected when a force is applied transversely to the beam, typically in a collision between several vehicles, thus enabling greater safety for people inside the vehicles.

Thus it is clear that despite the abundant literature already published, and therefore the very important research efforts already dedicated to the field of development of beams for the production of motor vehicle structures, the person skilled in the art has, so far, failed to achieve a truly satisfactory solution.

SUMMARY OF THE INVENTION

The invention aims to provide a new geometry of parts to ensure good resistance and stiffness, and allow the creation of areas whose deformation is expected during the application of pressure.

The above object is achieved, according to the invention, through a motor vehicle bodywork beam having a longitudinal direction and comprising:
- a main reinforcement having a bottom, two side walls forming with said bottom an angle between 80° and 120°, and two flanges that are substantially parallel to the bottom, which are inclined to the bottom at a maximum angle of 10°;
- at least a secondary reinforcement having a bottom and at least one side wall forming, with the bottom, an angle between 80° and 120°, said at least one secondary reinforcement is fixed to the main reinforcement;

characterized in that:
- the main reinforcement and the at least one secondary reinforcement are fixed at each side wall,
- at least one of the side walls and/or bottom of the main reinforcement and/or the secondary reinforcement comprise a transition, such that at least a part of the secondary reinforcement bottom is in contact with a part of the bottom of the main reinforcement,
- the bodywork beam has at least one closed cell formed by the assembly of the main reinforcement and a secondary reinforcement and the cell comprising four linear segments formed by side wall elements or bottoms of the main reinforcement and/or secondary reinforcement, at least three linear segments covering at least 50% of the corresponding dimension of the cell, so that two segments are oriented transversely to the bottom of the main reinforcement, and the other two segments are substantially perpendicular to said two first segments at an angle between 80° and 120°.

After much research, the applicant has determined that the particular compromise that meets the definition above optimizes the mechanical resistance and stiffness of the beam, especially with respect to its mass.

In the context of this application, the term "a closed cell having four linear segments" means a closed cell having at least four linear segments and thus can optionally be defined by a number of segments higher than four, e.g. five segments.

In the context of this application, the term "linear" means a segment whose deflection is less than 10% (the ratio between the gap which separates a chord which underlays a segment and the point of the segment the furthest from this chord, and the magnitude of the chord).

According to other advantageous features, but not limiting the invention:

- the main reinforcement and at least one secondary reinforcement are fixed at the level of each of their side walls and/or at least two secondary reinforcements are fixed at the level of each of their side walls;
- the bottom of the main reinforcement and/or the bottom of at least one secondary reinforcement have a rib, and said bottom of the main reinforcement and/or the bottom of at least one secondary reinforcement are connected at the level of their respective ribs; and/or at least two secondary reinforcements have a bottom with a rib and said at least two secondary reinforcements are connected at each of their bottoms at the level of their respective ribs;
- the main reinforcement and/or at least one secondary reinforcement have a grooved bottom, wherein the groove is centered;
- the main reinforcement and/or at least one secondary reinforcement have a grooved bottom, wherein the groove is offset on one side;
- the main and at least one secondary reinforcements have a grooved bottom, wherein the groove is oblique, and/or at least two secondary reinforcements having a grooved bottom, wherein the groove is oblique;
- the main reinforcement and/or at least one secondary reinforcement have a grooved bottom, wherein the grooved bottom has flanks of different lengths;
- at least one secondary reinforcement is arranged above the main reinforcement;
- at least one secondary reinforcement is arranged below the main reinforcement;
- at least one secondary reinforcement is L-shaped;
- at least one secondary reinforcement is U-shaped;
- said at least one cell formed by the main reinforcement and a secondary reinforcement, and/or by at least two secondary reinforcements, has a height between 8 mm and 100 mm;
- the main reinforcement and secondary reinforcements have a grooved bottom having a groove depth between 8 mm and 50 mm;
- at least one segment has a groove or a shoulder or step.

The height of each cell taken perpendicularly to the bottom of the main reinforcement is less than or equal to one third of the total depth of the bodywork beam.

The radii of the transition angles between two adjacent linear segments are less than 10 mm and have a smaller size than that of the adjacent segments.

BRIEF DESCRIPTION OF THE DRAWINGS

Other features, objects and advantages of the present invention will become apparent from reading the detailed description that follows, and from the accompanying drawings given as non-limiting examples and in which:

FIG. 1 shows a cross sectional view, according to the present invention, of a bodywork beam in a first embodiment;

FIG. 2 shows a cross sectional view of a bodywork beam, according to a different embodiment;

FIG. 9 shows a cross sectional view of a bodywork beam, according to one embodiment, having several secondary reinforcements;

FIG. 10 shows a cross sectional view of a first bodywork beam, according to the state of the art;

FIG. 10a shows a cross sectional view of a second bodywork beam, according to the state of the art;

FIG. 10b shows a cross sectional view of a third bodywork beam, according to the state of the art using the solution described in the patent EP1190938;

FIG. 10c shows a cross sectional view of a fourth bodywork beam, according to the state of the art using the solution described in the patent EP2066549;

FIG. 11 shows a curve which compares the four point bending resistance of a bodywork beam, according to the first embodiment shown in FIG. 1 FIG. 1a, a beam according to the state of the art shown in FIG. 10 and a beam according the state of the art shown in FIG. 10a;

FIG. 13 shows a cross sectional view of a bodywork beam, according to one embodiment, which is an alternative to the embodiment shown in FIG. 5;

FIG. 14 shows a cross sectional view of a bodywork beam according to a further embodiment;

FIG. 22 shows a side view of the same parts, namely a main reinforcement, a secondary reinforcement and an inner panel, and 5 successive sections of this assembly.

As shown in FIGS. 1 to 9 and 12 to 17, and 18 to 22, the present invention relates to a bodywork beam 1 elongated in a longitudinal direction that is transverse to the plane of FIGS. 1 to 9 and 12 to 19, comprising: a hat-shaped main reinforcement 5, which is arranged in the space 4 between the outer panel 2 and the inner panel 3. The main reinforcement 5 includes a bottom 51 connected at each of its ends to a respective side wall 52, 53. The side walls 52 and 53 are each connected at their last end to an flange 54, 55. The angles formed by the side walls 52 and 53 with the bottom 51 are substantially equal to 90°, advantageously between 80° and 120°. The flanges 54 and 55 are substantially parallel to the bottom 51, the difference in angle between the flanges 54 and 55 with the bottom 51 being less than 10°, and are preferably oriented outwards.

Figure 3:
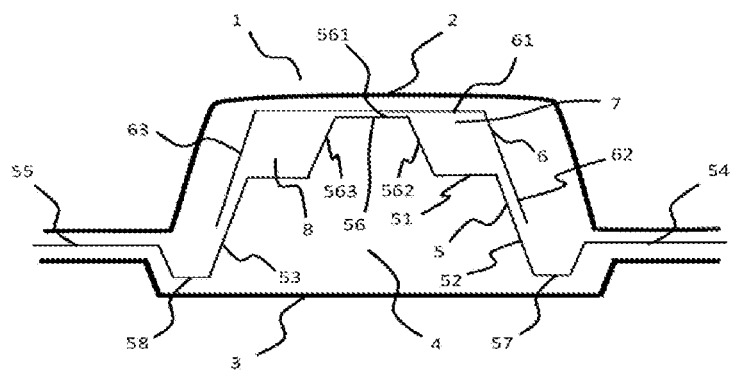
FIG. 3 shows a cross sectional view of a bodywork beam, according to another embodiment.

At least one secondary reinforcement 6, 60a, 60b, which is arranged in the space 4 between the outer panel 2 and the inner panel 3. The addition of at least one secondary reinforcement 6, 60a, 60b brings greater stiffness to the structure by creating at least one cell 7, 8, 7a, 8a, 7b, 8b, 9. The at least one secondary reinforcement 6, 60a, 60b can be in the shape of a U, which has a bottom 61, 610a, 610b connected at each of its ends to the side wall 62, 63, 620a, 620b, 630a, 630b, or in the shape of an L, which has a bottom 61, 610a, 610b connected at only one of its ends to a side wall 62 63, 620a, 620b, 630a, 630b. The angles formed by the side walls 62, 63, 620a, 620b, 630a and 630b with the bottom 61, 610a, 610b are substantially equal to 90°, advantageously between 80° and 120°.

As can be seen in FIGS. 1 to 9, 12 to 17, and 18 to 22, the beam may also comprise:

a hat-shaped outer panel 2, which is arranged on the outer face of the bodywork beam 1, the outer face being the face which is directed towards the outside of the vehicle, and that is the face on which, for example, a force is directly applicable in a collision between two vehicles.

a hat-shaped inner panel 3, which is arranged on the inside face of the bodywork beam 1, the inside face being the face directed towards the interior of the vehicle. The outer panel 2 and the inner panel 3 are arranged by directing their concavity one to the other, facing each other, towards the inside of the bodywork beam 1, so as to create a space 4.

The beam 1 can have a constant section over its entire length. The reinforcements 5, 6, 60a and 60b are fixed together. Preferentially, the reinforcements 5, 6, 60a and 60b are connected at each of their side walls, and can also be connected at their bottoms. They can be fixed at the level of their points of contact by welding or riveting. Other assembly techniques known to the skilled person in the art, as for example tempering or gluing, can also be used depending on the various benefits they may bring.

The outer panel 2, the inner panel 3 and the main reinforcement 5 are fixed, for example by welding, at the level of each of their flanges.

This patent application defines a secondary reinforcement 6, 60a or 60b placed above the main reinforcement 5 if the secondary reinforcement is arranged between the outer panel 2 and said main reinforcement 5. It also defines a reinforcement 6, 60a or 60b arranged below the main reinforcement 5 if the reinforcement is arranged between the inner panel 3 and said main reinforcement 5.

In the embodiment shown in FIGS. 1 and 1a, the secondary reinforcement 6 is placed below the main reinforcement 5, so as to fit in said main reinforcement 5 and bring the side walls 63 and 53 and the side walls 52 and 62 into contact. The bottom 51 of the main reinforcement 5 has a groove 56, which is centered with respect to the two side walls 52 and 53 and whose concavity is directed towards the outer panel 2. The groove 56 has a bottom 561 connected at each one of its ends to a flank 562 and 563. The flanks 562 and 563 are substantially perpendicular to the bottom 561, the angles formed by the flanks 562 and 563 with bottom 561 being between 80° and 120°. The bottom 61 of the secondary reinforcement 61 also has a groove 64, which is centered with respect to the two side walls 62 and 63 and whose concavity is directed towards the inner panel 3. The groove 64 has a bottom 641 connected at each one of its ends to a flank 642, 643. The flanks 642 and 643 are substantially perpendicular to the bottom 641, the angles formed by the flanks 642 and 643 with bottom 641 being between 80° and 120°. The orientation, as well as the depth, of the grooves 56 and 64 allows bringing the reinforcements 5 and 6 at the level of bottom 561 and 641 of their respective groove 56 and 64 into contact. The angle formed by the flanks 562 and 642 as well as the angle formed by the flanks 563 and 643 are both between 160° and 180°. The arrangement of the reinforcements 5 and 6 allow two cells 7 and 8 to be formed. The segments of the cell 7 are formed by the side wall 52, the bottom 51, the flank 562 of the groove 56, the flank 642 of the groove 64, and the bottom 61. More specifically, as shown In FIG. 1a, the segment 71 is formed by the side wall 52, the segment 72 is formed by the bottom 51, the segment 73 is formed by the flank 562, the segment 74 is formed by the bottom 61, and the segment 75 is formed by the flank 642. The segments of the cell 8 are formed by the side wall 53, the bottom 51, the flank 563 of the groove 56, the flank 643 of the groove 64, and the bottom 61. More specifically, as shown in FIG. 1a, the segment 81 is formed by the side wall 53, the segment 82 is formed by the bottom 51, the segment 83 is formed by the flank 563, the segment 84 is formed by the bottom 61, and the segment 85 is formed by the flank 643. Thus, the cells 7 and 8 have five segments, respectively 71, 72, 73, 74, 75 and 81, 82, 83, 84, 85 of which three segments 71, 73, 75, and 81, 83, 85 are substantially transverse to the bottom 51 of the main reinforcement 5, the angle formed by the bottom 51 and the segments 71, 73, 75, 81, 83, 85 being between 80° and 120°, and the two other segments 72, 74 and 82, 84 are substantially perpendicular to the first ones, being generally parallel to the bottom 51.

In a variant of this embodiment, the flanks 562, 642 and 563, 643 of the grooves 56 and 64 substantially only form a single segment for each of the cells because the reinforcements 5 and 6 are fixed to each other, the grooves 64 and 56 cannot move independently one from the other, and the angles formed by the flanks 562, 642 and 563, 643 of the grooves 56 and 64 are substantially flat, because the deflection of the segments formed by the flanks 562, 642 and 563, 643 is less than 10% (when the angles between the flanks 562, 642 and 563, 643 are close to 180°).

Figure 11:
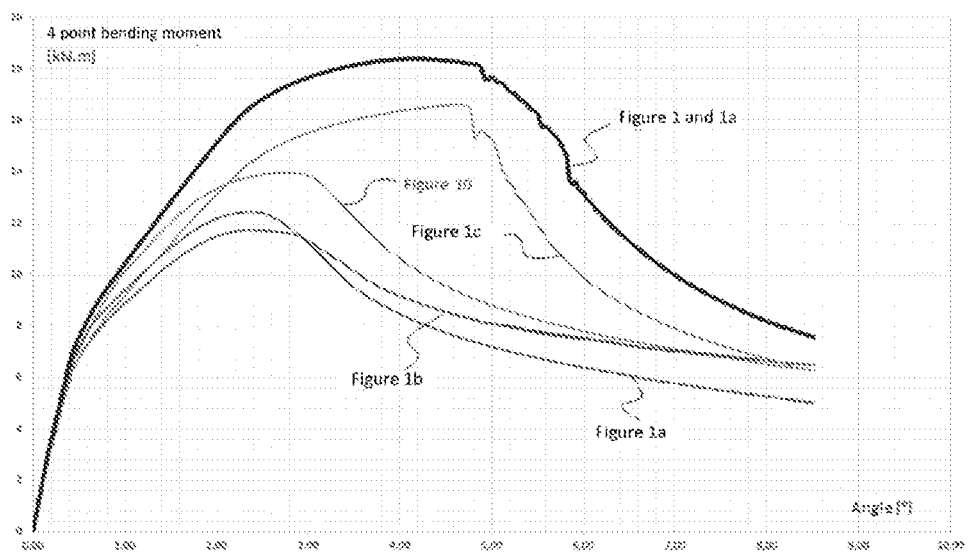

The comparison between the 4 point bending resistance curves shown in FIG. 11, between the bodywork beam 1, a beam according to the state of the art disclosed in FIG. 10, a beam according to the state of the art disclosed in FIG. 10a, a beam according to the state of the art disclosed in FIG. 10b and a beam according to the state of the art described in FIG. 10c, clearly shows that the invention allows obtaining better strength. As part of the comparison of the strength, the outer panel 2, the inner panel 3, the main reinforcement 5 and the secondary reinforcement 6 are welded in the same manner for all the beams. In addition, tests were made with (ISO) mass beams. In FIG. 10, the outer panel has a thickness of 0.7 mm, the inner panel has a thickness of 1.2 mm, and the main reinforcement has a thickness of 1.9 mm. In FIG. 10b is, the outer panel has a thickness of 0.7 mm, the inner panel has a thickness of 1.2 mm, and the main reinforcement has a thickness of 1.5 mm and the secondary reinforcement has a thickness of 0.8 mm. In FIGS. 10a, 10b, and 10c the outer panel has a thickness of 0.7 mm, the inner panel has a thickness of 1.2 mm, and the main reinforcement has a thickness of 1.5 mm and the secondary reinforcement has a thickness of 0.8 mm.

In the embodiment shown in FIG. 2, the secondary reinforcement 6 is arranged above the main reinforcement 5, such that the main reinforcement 5 fits into the secondary reinforcement 5 thus bringing the side walls 52 and 62 and the side walls 53 and 63 into contact. The bottom 51 of the main reinforcement 5 has a groove 56 whose concavity is directed towards the inner panel 3. The groove 56 has a bottom 561 connected at each one of its ends to a flank 562 and 563. The flanks 562 and 563 are substantially perpendicular to the bottom 561, the angles formed by the flanks 562 and 563 with bottom 561 being between 80° and 120°. The bottom 61 of the secondary reinforcement 6 has a groove 64 whose concavity is directed towards the outer panel 2. The groove 64 has a bottom 641 connected at each one of its ends to a flank 642, 643. The flanks 642 and 643 are substantially perpendicular to the bottom 641, the angles formed by the flanks 642 and 643 with bottom 641 being between 80° and 120°. The orientation, as well as the depth, of the grooves 56 and 64 allows bringing the reinforcements 5 and 6 at the bottom 561 and 641 of their respective groove 56 and 64 into contact. The angle formed by the flanks 562 and 642 as well as the angle formed by the flanks 563 and 643, are both between 160° and 180°. The arrangement of the reinforcements 5 and 6 allow two cells 7 and 8 to be formed. The segments of the cell 7 are formed by the side wall 62, the bottom 51, the flank 562 of the groove 56, the flank 642 of the groove 64, and the bottom 61. The segments of the cell 8 are formed by the side wall 63, the bottom 51, the flank 563 of the groove 56, the flank 643 of the groove 64, and the bottom 61. Thus, the cells 7 and 8 have five segments, two of which are transverse to the bottom 51 of the main reinforcement 5, and the other two are substantially perpendicular to the first ones.

In a variant of this embodiment, the grooves 56 and 64 substantially only form a single segment for each of the cells because the reinforcements 5 and 6 are fixed to each other, the grooves 64 and 56 cannot move independently one from the other, and the angles formed by the flanks 562, 642 and 563, 643 of the grooves 56 and 64 are substantially flat, because the deflection of the segments formed by the flanks 562, 642 and 563, 643 is less than 10% (when the angles between the flanks 562, 642 and 563, 643 are close to 180°).

In the embodiment shown in FIG. 3, the secondary reinforcement 6 is arranged above the main reinforcement 5, such that the main reinforcement 5 fits into the secondary reinforcement 6 thus bringing the side walls 52 and 62 and the side walls 53 and 63 into contact. The bottom 51 of the main reinforcement 5 has a groove 56 whose concavity is directed towards the inner panel 3. The groove 56 has a bottom 561 connected at each one of its ends to a flank 562 and 563. The flanks 562 and 563 are substantially perpendicular to the bottom 561, the angles formed by the flanks 562 and 563 with bottom 561 being between 80° and 120°. The orientation and the depth of the groove 56 allow bringing the bottom 561 into contact with the bottom 61 of the secondary reinforcement 6. The main reinforcement 5 also has two grooves 57 and 58, which are located between the side walls 52, 53 and the flanges 54, 55. The concavity of grooves 57 and 58 is directed toward the outer panel 2. These two grooves 57 and 58 can increase the resistance of the reinforcement 5 on the application of a transverse compression to the beam 1 and the bending induced by this compression, this compression being created for example by a collision between two vehicles. The arrangement of the reinforcements 5 and 6 allows two cells 7 and 8 to be formed. The segments of the cell 7 are formed by the side wall 62, the bottom 51, the flank 562 of the groove 56 and the bottom 61. The segments of the cell 8 are formed by the side wall 63, the bottom 51, the flank 563 of the groove 56 and the bottom 61. Thus, the cells 7 and 8 have four segments, two of which are transverse to the bottom 51 of the main reinforcement 5, and the other two are substantially perpendicular to the first ones, the angles formed by the segments being between 80° and 120°. This embodiment provides additional resistance to the cells 7 and 8 as all their segments are perfectly linear.

As mentioned above, in the context of this application the term "linear" means a segment whose deflection is less than 10% (the ratio between the gap, which separates a chord underlying a segment and the furthest point of the segment from this chord, and the magnitude of the chord).

Figure 4:
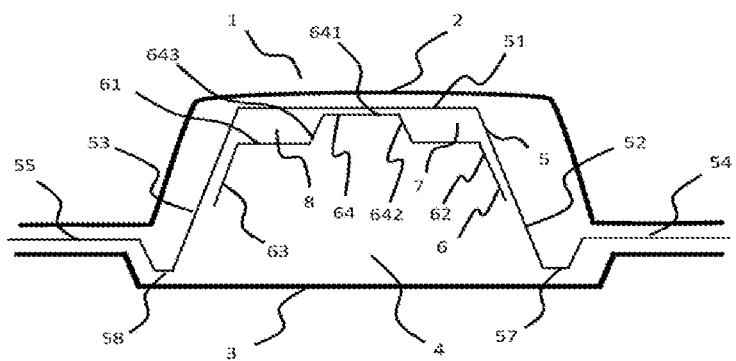
FIG. 4 shows a cross sectional view of a bodywork beam, according to a further embodiment.
Figure 15:
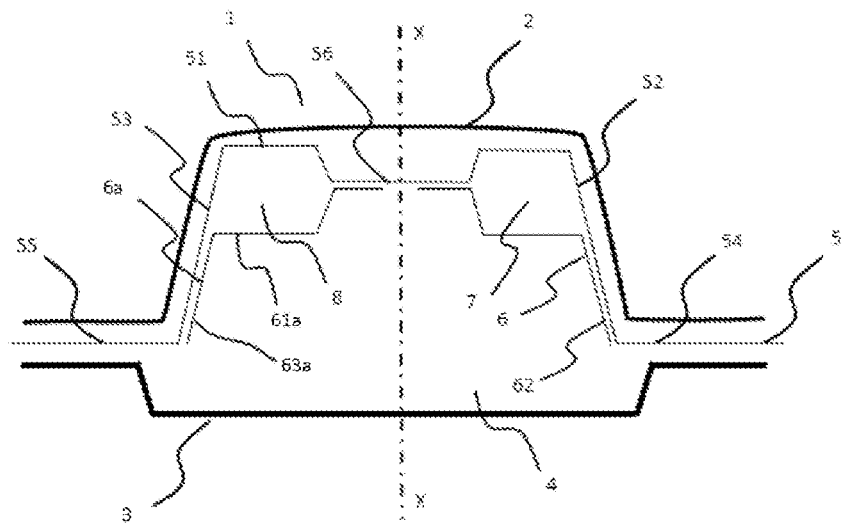
FIG. 15 shows a cross sectional view of a bodywork beam, according to one embodiment using several secondary reinforcements arranged side by side.

In the embodiment represented in FIG. 4, the secondary reinforcement 6 is arranged below the main reinforcement 5, such that the secondary reinforcement 6 fits into the main reinforcement 5 thus bringing the side walls 52 and 62 and the side walls 53 and 63 into contact. The bottom 61 of the secondary reinforcement 6 has a groove 64 whose concavity is directed towards the inner panel 3. The groove 64 has a bottom 641 connected at each one of its ends to a flank 642 and 643. The flanks 642 and 643 are substantially perpendicular to the bottom 641, the angles formed by the flanks 642 and 643 with bottom 641 being between 80° and 120°. The orientation and the depth of the groove 64 allow bringing the bottom 641 into contact with the bottom 51 of the main reinforcement 5. The main reinforcement 5 also has two grooves 57 and 58, which are located between the side walls 52, 53 and the flanges 54, 55. The concavity of grooves 57 and 58 is directed toward the outer panel 2. These two grooves 57 and 58 can increase the resistance of the reinforcement 5 on the application of a transverse compression to the beam 1 and the bending induced by this compression, this compression being created, for example, by a collision between two vehicles. The arrangement of the reinforcements 5 and 6 allows two cells 7 and 8 to be formed. The segments of the cell 7 are formed by the side wall 52, the bottom 51, the flank 642 of the groove 64 and the bottom 61. The segments of the cell 8 are formed by the side wall 53, the bottom 51, the flank 643 of the groove 64 and the bottom 61. Thus, the cells 7 and 8 have four segments, two of which are transverse to the bottom 51 of the main reinforcement 5, and the other two are substantially perpendicular to the first ones, the angles formed by the segments being between 80° and 120°. This embodiment provides additional resistance to the cells 7 and 8 as all their segments are perfectly linear. In addition, two secondary L-shaped reinforcements may be arranged on each side of the main reinforcement 5 so as to create two cells. Each of the secondary reinforcements is connected to a side wall 52, 53 and 51 at the bottom of the main reinforcement 5. These secondary reinforcements may be of different thicknesses or shapes so as to create a dissymmetry. Such a variant is illustrated in FIG. 15, in which the two secondary reinforcements are referenced 6 and 6a.

Figure 5:
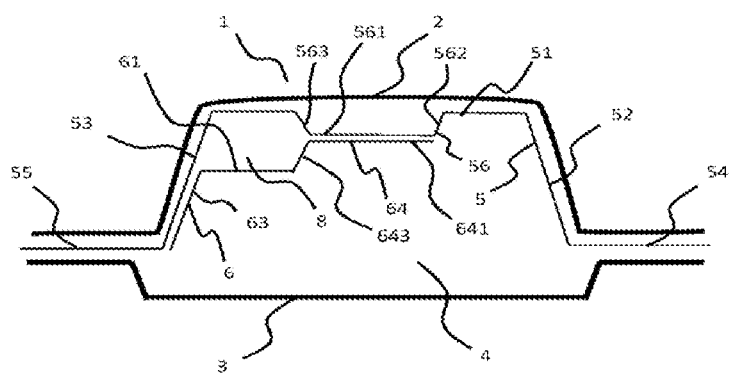
FIG. 5 shows a cross sectional view of a bodywork beam part, according to one embodiment, which allows obtaining a dissymmetry in the structure of the bodywork beam.

In the embodiment schematically shown in FIG. 5, the secondary reinforcement 6 is arranged below the main reinforcement 5, such that the secondary reinforcement 6 fits into the main reinforcement 5, thus bringing the side wall 53 into contact with the side wall 63. The bottom 51 of the main reinforcement 5 has a groove 56, whose concavity is directed towards the outer panel 2. The groove 56 has a bottom 561 connected at each one of its ends to a flank 562 and 563. The flanks 562 and 563 are substantially perpendicular to the bottom 561, the angles formed by the flanks 562 and 563 with bottom 561 being between 80° and 120°. The bottom 61 of the secondary reinforcement 6 has a groove 64 whose concavity is orientated towards the inner panel 3. The groove 64 has a bottom 641 connected at each one of its ends to a flank 643. The flank 643 is substantially perpendicular to the bottom 641, the angle formed by the flank 643 with the bottom 641 being between 80° and 120°. The orientation, as well as the depth, of the grooves 56 and 64 allows bringing the reinforcements 5 and 6 at the level of bottom 561 and 641 of their respective groove 56 and 64 into contact. The angle formed by the flanks 563 and 643 is between 160° and 180°. The arrangement of the reinforcements 5 and 6 thus allows forming a cell 8, which has five segments formed by the bottom 61, the flank 643 of the groove 64, the flank 543 of the groove 56, the bottom 51 and the side wall 53. The cell 8, therefore, comprises four segments, of which two first segments are transversal to the bottom 51 of the main reinforcement 5, and two segments are substantially perpendicular to said first two segments.

In a variant of this embodiment, the flanks 563 and 643 substantially only form a single segment because the reinforcements 5 and 6 are fixed to each other, the grooves 64 and 56 cannot move independently one from the other, and the angle formed by the flanks 562 and 643 of the grooves 56 and 64 is substantially flat, as the deflection of the segment formed by the flanks 562, and 643 is less than 10% (when the angle between the flanks 563 and 643 is close to 180°).

This embodiment allows making the internal structure of the beam 1 dissymmetrical, the cell 8 being offset to one side of the beam 1, to create an area where the resistance is lower. The creation of an area of lower resistance allows forcing the deformation, at the time of a collision, to occur such as forecast, so that the structure of the vehicle deforms, thereby minimizing the risks to passengers of said vehicle.

Figure 6:
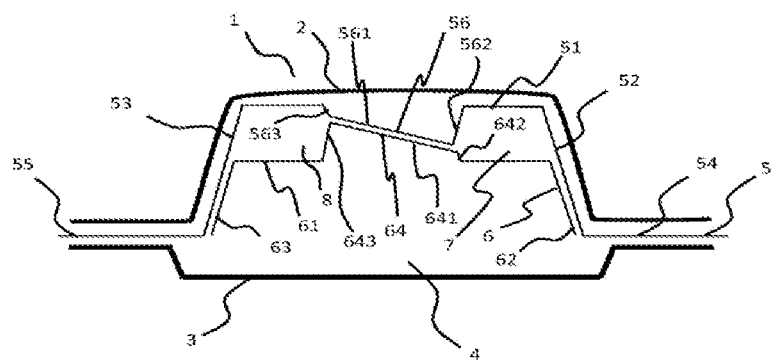
FIG. 6 shows a cross sectional view of a bodywork beam part, according to one embodiment, which allows obtaining a dissymmetry in the structure of the part different to that shown in FIG. 5.

In the embodiment described in FIG. 6, the secondary reinforcement 6 is arranged below the main reinforcement 5, such that the secondary reinforcement 6 fits into the main reinforcement 5 thus bringing the side wall 52 into contact with the side wall 62, and the side wall 53 into contact with the side wall 63. The bottom 51 of the main reinforcement 5 has a groove 56. The groove 56 has a bottom 561 connected at each one of its ends to a flank 562 and 563. The groove 56 is oblique, so that its flanks are of different lengths and that the flanks 642 and 643 are not substantially perpendicular to the base 641. In this embodiment, the flank 562 is longer than the flank 563. The concavity of the groove 56 is directed toward the outer panel 2. The bottom 61 of the secondary reinforcement 6 has a groove 64. The groove 64 has a bottom 641 connected at each one of its ends to a flank 642 and 643. The groove 64 is oblique, so as to be parallel to the groove 56. The concavity of the groove 64 is directed toward the inner panel 3. The orientation, as well as depth, of the grooves 56 and 64 brings the reinforcements 5 and 6 at the level of bottoms 561 and 641 of their respective groove 56 and 64 into contact. The angle formed by the flanks 562 and 642 as well as the angle formed by the flanks 563 and 643, are both between 160° and 180°. The arrangement of the reinforcements 5 and 6 allows two cells 7 and 8 to be formed. The segments of the cell 7 are formed by the side wall 52, the bottom 51, the flank 562 of the groove 56, the flank 642 of the groove 64, and the bottom 61. The segments of the cell 8 are formed by the side wall 53, the bottom 51, the flank 563 of the groove 56, the flank 643 of the groove 64, and the bottom 61. Thus, the cells 7 and 8 have five segments, two of which are transverse to the bottom 51 of the main reinforcement 5, and the other two are substantially perpendicular to the first ones, being generally parallel to the bottom 51.

In a variant of this embodiment, the flanks 562, 642 and 563, 643 of the grooves 56 and 64 substantially only form a single segment for each of the cells because the reinforcements 5 and 6 are fixed to each other, the grooves 64 and 56 cannot move independently one from the other, and the angles formed by the flanks 562, 642 and 563, 643 of the grooves 56 and 64 are substantially flat, because the deflection of the segments formed by the flanks 562, 642 and 563, 643 is less than 10% (when the angles between the flanks 562, 642 and 563, 643 are close to 180°).

This embodiment allows making the internal structure of the beam 1 dissymmetrical, the ribs 56 and 64 being oblique, in order to create an area where the resistance is lower. The creation of an area of lower resistance allows forcing the deformation, at the time of a collision, to occur such as forecast, so that the structure of the vehicle deforms, thereby minimizing the risks to passengers of said vehicle.

Figure 7:
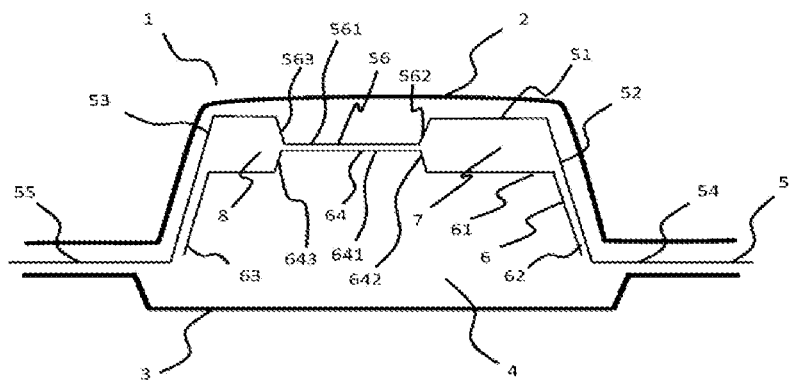
FIG. 7 shows a cross sectional view of a bodywork beam, according to one embodiment, which allows obtaining a dissymmetry in the structure of the bodywork beam different to those shown in FIGS. 5 and 6.

In the embodiment described in FIG. 7, the secondary reinforcement 6 is arranged below the main reinforcement 5, such that the secondary reinforcement 6 fits into the main reinforcement 5 thus bringing the side wall 52 into contact with the side wall 62, and the side wall 53 into contact with the side wall 63. The bottom 51 of the main reinforcement 5 has a groove 56. The groove 56 has a bottom 561 connected at each one of its ends to a flank 562 and 563. The flanks 562 and 563 are substantially perpendicular to the bottom 561, the angles formed by the flanks 562 and 563 with bottom 561 being between 80° and 120°. The groove 56 is offset, so that it is closer to the side wall 53 than the side wall 52. The concavity of the groove 56 is directed toward the outer panel 2. The bottom 61 of the secondary reinforcement 6 has a groove 64. The groove 64 has a bottom 641 connected at each one of its ends to a flank 642 and 643. The flanks 642 and 643 are substantially perpendicular to the bottom 641, the angles formed by the flanks 642 and 643 with the bottom 641 being between 80° and 120°. The groove 64 is offset so as to be situated opposite the groove 56. The concavity of the groove 64 is directed toward the inner panel 3. The orientation, as well as the depth, of the grooves 56 and 64 brings the reinforcements 5 and 6 at the level of bottom 561 and 641 of their respective groove 56 and 64 into contact. The angle formed by the flanks 562 and 642 as well as the angle formed by the flanks 563 and 643 are both between 160° and 180°. The arrangement of the reinforcements 5 and 6 allows two cells 7 and 8 to be formed. The segments of the cell 7 are formed by the side wall 52, the bottom 51, the flank 562 of the groove 56, the flank 642 of the groove 64, and the bottom 61. The segments of the cell 8 are formed by the side wall 53, the bottom 51, the flank 563 of the groove 56, the flank 643 of the groove 64, and the bottom 61. Thus, the cells 7 and 8 have five segments, two of which are substantially transverse to the bottom 51 of the main reinforcement 5, and the other two are substantially perpendicular to the first ones, being generally parallel to the bottom 51.

In a variant of this embodiment, the flanks 562, 642 and 563, 643 of the grooves 56 and 64 substantially only form a single segment for each of the cells because the reinforcements 5 and 6 are fixed to each other, the grooves 64 and 56 cannot move independently one from the other, and that the angle formed by the flanks 562, 642 and 563, 643 of the grooves 56 and 64 are substantially flat, because the deflection of the segments formed by the flanks 562, 642 and 563, 643 is less than 10% (when the angles between the flanks 562, 642 and 563, 643 are close to 180°).

Figure 16:
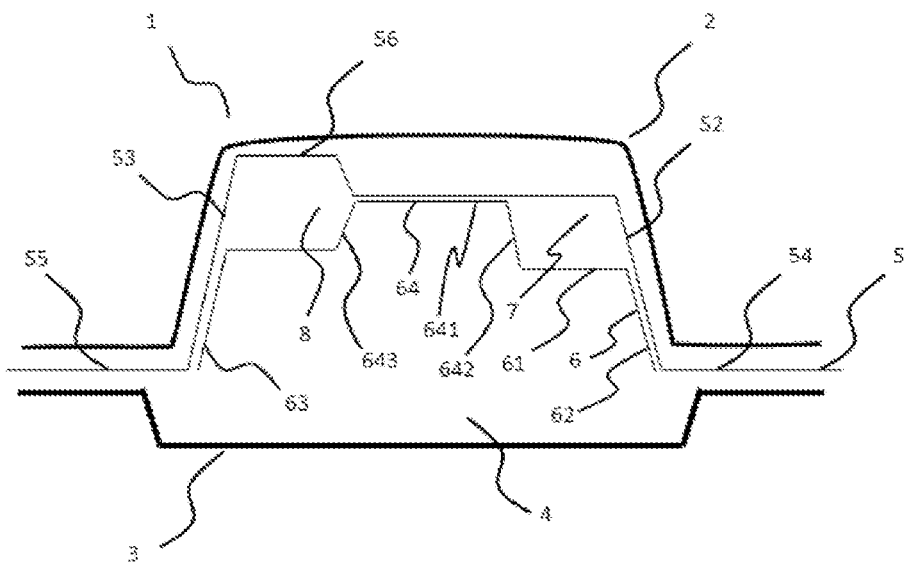
FIG. 16 shows a cross sectional view of a bodywork beam, according to one embodiment, which is a variant of the embodiment described in FIG. 7.

This embodiment makes the internal structure of the beam 1 dissymmetrical, the cell 7 being longer than the cell 8, in order to create an area where the strength is lower. The creation of an area of lower strength allows forcing the deformation, at the time of a collision, to occur such as forecast, so that the structure of the vehicle deforms, thereby minimizing the risks to passengers of said vehicle. A variant of this embodiment is illustrated in FIG. 16.

Figure 8:
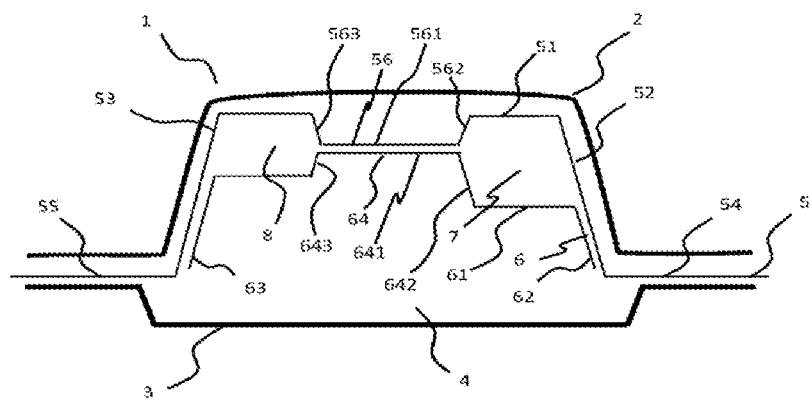
FIG. 8 shows a cross sectional view of a bodywork beam, according to one embodiment, which allows obtaining a dissymmetry in the size of the cells.

In the embodiment described in FIG. 8, the secondary reinforcement 6 is arranged below the main reinforcement 5, such that the secondary reinforcement 6 fits into the main reinforcement 5 thus bringing the side wall 52 into contact with the side wall 62, and the side wall 53 into contact with the side wall 63. The bottom 51 of the main reinforcement 5 has a groove 56. The groove 56 has a bottom 561 connected at each one of its ends to a flank 562 and 563. The flanks 562 and 563 are substantially perpendicular to the bottom 561, the angles formed by the flanks 562 and 563 with the bottom 561 being between 80° and 120°. The concavity of the groove 56 is directed towards the outer panel 2. The bottom 61 of the secondary reinforcement 6 has a groove 64. The groove 64 has a bottom 641 connected at each one of its ends to a flank 642 and 643. The flanks 642 and 643 are substantially perpendicular to the bottom 641, the angles formed by the flanks 642 and 643 with bottom 641 being between 80° and 120°. The flanks 642 and 643 are each of a different length. The concavity of the groove 64 is directed toward the inner panel 3. The orientation, as well as the depth, of the grooves 56 and 64 allows bringing the reinforcements 5 and 6 at the level of bottom 561 and 641 of their respective groove 56 and 64 into contact. The angle formed by the flanks 562 and 642 as well as the angle formed by the flanks 563 and 643 are both between 160° and 180°. The arrangement of the reinforcements 5 and 6 allow two cells 7 and 8 to be formed. The segments of the cell 7 are formed by the side wall 52, the bottom 51, the flank 562 of the groove 56, the flank 642 of the groove 64, and the bottom 61. The segments of the cell 8 are formed by the side wall 53, the bottom 51, the flank 563 of the groove 56, the flank 643 of the groove 64, and the bottom 61. Thus, the cells 7 and 8 have five segments, two of which are substantially transverse to the bottom 51 of the main reinforcement 5, and the other two are substantially perpendicular to the first ones, being generally parallel to the bottom 51.

In a variant of this embodiment, the flanks 562, 642 and 563, 643 of the grooves 56 and 64 substantially only form a single segment for each of the cells because the reinforcements 5 and 6 are fixed to each other, the grooves 64 and 56 cannot move independently one from the other, and the angles formed by the flanks 562, 642 and 563, 643 of the grooves 56 and 64 are substantially flat, because the deflection of the segments formed by the flanks 562, 642 and 563, 643 is less than 10% (when the angles between the flanks 562, 642 and 563, 643 are close to 180°).

This embodiment allows making the internal structure of the beam 1 dissymmetrical, the cell 7 being higher than the cell 8, in order to create an area where the resistance is lower. The creation of an area of lower resistance allows forcing the deformation, at the time of a collision, to occur such as forecast, so that the structure of the vehicle deforms minimizing the risks to passengers of said vehicle.

In the embodiment represented in FIG. 9, two secondary reinforcements 60a and 60b of similar shape are arranged below the main reinforcement 5, such that the secondary reinforcement 60b fits into the secondary reinforcement 60a, thus bringing the side walls 620a and 620b into contact, and the side walls 630a and 630b into contact. The secondary reinforcement 60a fits itself into the main reinforcement 5, thereby bringing the side walls 52 and 620a into contact, and the side walls 53 and 630a into contact. The bottom 610a of the secondary reinforcement 60a has a groove 640a whose concavity is directed towards the inner panel 3. The groove 640a has a bottom 641a connected at each one of its two ends to a flank 642a and 643a. The flanks 642a and 643a are substantially perpendicular to the bottom 641a, the angles formed by the flanks 642a and 643a with the bottom 641a being between 80° and 120°. The bottom 610b of the secondary reinforcement 60b has a groove 640b whose concavity is directed towards the inner panel 3. The groove 640b has a bottom 641b connected at each one of its two ends to a flank 642b and 643b. The flanks 642b and 643b are substantially perpendicular to the bottom 641b, the angles formed by the flanks 642b with the bottom 641b being between 80° and 120°. The orientation and the depth of the grooves 640a and 640b allow bringing into contact the flanks 642a, 642b and 643a, 643b of the grooves 640a and 640b by fitting the groove 640b into the groove 640a without bringing into contact the bottom 641a of the groove 640a with the bottom 641b of the groove 640b. The orientation and the depth of the groove 640a allow bringing the bottom 640a into contact with the bottom 51 of the main reinforcement 5. The main reinforcement 5 also has two grooves 57 and 58, which are located between the side walls 52, 53 and the flanges 54, 55. The concavity of grooves 57 and 58 is directed toward the outer panel 2. These two grooves 57 and 58 can increase the resistance of the reinforcement 5 on the application of a transverse compression to the beam 1 and the bending induced by this compression, this compression being created by a collision between two vehicles. The arrangement of the reinforcements 5, 60a and 60b allows five cells 7a, 7b, 8a, 8b and 9 to be formed. The segments of the cell 7a are formed by the side wall 52, the bottom 51, the flank 642a of the groove 640a and the bottom 610a. The segments of the cell 7b are formed by the side wall 620a, the bottom 610a, the flank 642b of the groove 640b and the bottom 610b. The segments of the cell 8a are formed by the side wall 53, the bottom 51, the flank 643a of the groove 640a and the bottom 610a. The segments of the cell 8b are formed by the side wall 630a, the bottom 610a, the flank 643b of the groove 640b and the bottom 610b. The segments of the cell 9 are formed by the flank 642a of the groove 640a, the bottom 641a of the groove 640a, the flank 643a of the groove 640a, and the bottom 641b of the groove 640b. Thus, the cells 7a, 7b, 8a, 8b and 9 have four segments, two of which are substantially transverse to the bottom 51 of the main reinforcement 5, and the other two are substantially perpendicular to the first ones, being generally parallel to the bottom 51, the angles formed by the segments being between 80° and 120°. This embodiment provides additional resistance to the cells 7a, 7b, 8a, 8b and 9 as all their segments are perfectly linear. This embodiment also increases the number of cells while adding an additional part.

Figure 12:
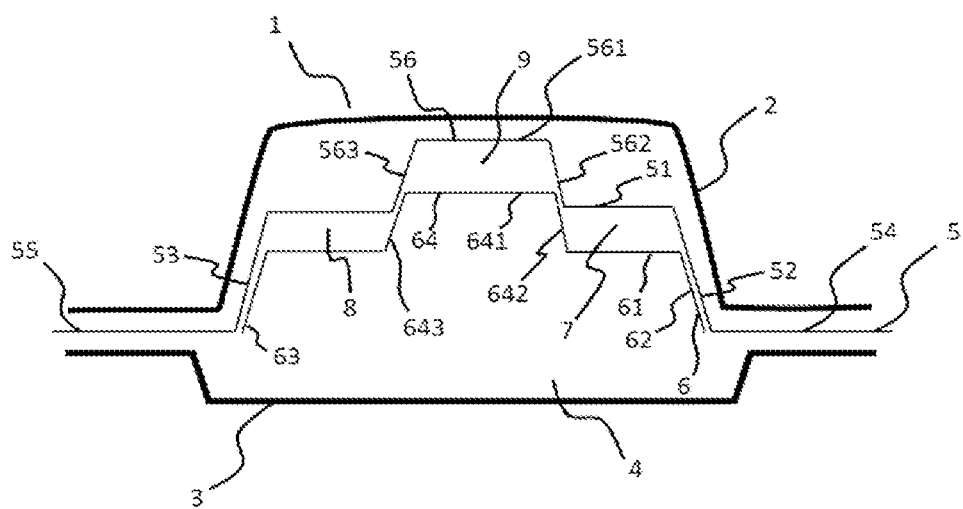
FIG. 12 shows a cross sectional view of a bodywork beam according to a further embodiment.
Figure 17:
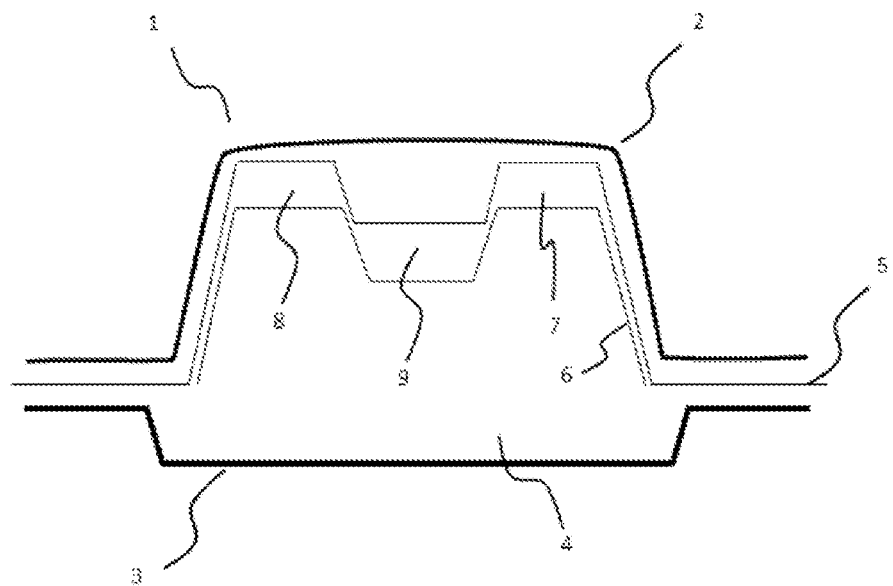
FIG. 17 shows a cross sectional view of a bodywork beam, according to one embodiment, which is a variant of the embodiment described in FIG. 12.

In the embodiment represented in FIG. 12, the secondary reinforcement 6 is placed below the main reinforcement 5, so as to fit in said main reinforcement 5 and bring the side walls 63 and 53 and the side walls 52 and 62 into contact. The bottom 51 of the main reinforcement 5 has a groove 56, which is centered with respect to the two side walls 52 and 53 and whose concavity is orientated towards the inner panel 3. The groove 56 has a bottom 561 connected at each one of its ends to a flank 562 and 563. The flanks 562 and 563 are substantially perpendicular to the bottom 561, the angles formed by the flanks 562 and 563 with the bottom 561 being between 80° and 120°. The bottom 61 of the secondary reinforcement 6 also has a groove 64, which is centered with respect to the two side walls 62 and 63 and whose concavity is directed towards the inner panel 3. The groove 64 has a bottom 641 connected at each one of its two ends to a flank 642 and 643. The flanks 642 and 643 are substantially perpendicular to the bottom 641, the angles formed by the flanks 642 and 643 with the bottom 641 being between 80° and 120°. The orientation, as well as the depth, of the grooves 56 and 64 allows bringing the reinforcements 5 and 6 at the level of bottom 561 and 641 of their respective groove 56 and 64 into contact. The arrangement of the reinforcements 5 and 6 thus allows three cells 7, 8 and 9 to be formed. The segments of the cell 7 are formed by the side wall 52, the bottom 51, the flank 642 of the groove 64 and the bottom 61. The segments of the cell 8 are formed by the side wall 53, the bottom 51, the flank 643 of the groove 64 and the bottom 61. The segments of the cell 9 are formed by the flank 562 of the groove 56, the bottom 561 of the groove 56, the flank 563 of the groove 56, and the bottom 641 of the groove 64. Thus, the cells 7, 8 and 9 have four segments, two of which are substantially transverse to the bottom 51 of the main reinforcement 5, the angle formed by the bottom 51 and said first segments being between 80° and 120°, and the other two are substantially perpendicular to the first ones, being generally parallel to the bottom 51, the angles formed by the two by two adjacent segments being between 80° and 120°. A variant of this embodiment is illustrated in FIG. 17. In this variant, the concavities of the grooves 56 and 64 are reversed with respect to the FIG. 12.

In the embodiment represented in FIG. 13, the secondary reinforcement 6 is placed below the main reinforcement 5, so as to fit in said main reinforcement 5 and bring the side walls 63 and 53 into contact and the side walls 52 and 62 into contact. The bottom 51 of the main reinforcement 5 has a groove 56, which is centered with respect to the two side walls 52 and 53 and whose concavity is directed towards the outer panel 2. The groove 56 has a bottom 561 connected at each one of its two ends to a flank 562 and 563. The flanks 562 and 563 are substantially perpendicular to the bottom 561, the angles formed by the flanks 562 and 563 with the bottom 561 being between 80° and 120°. The bottom 61 of the secondary reinforcement 6 has two shoulders or steps 65 and 66, which raise the bottom 61 towards the bottom 51. The angle formed by the shoulders or steps 65 and 66 is between 80° and 120°. The orientation, as well as the depth, of the groove 56 and the shoulders or steps 65 and 66 allow to bring the bottom 61 of the secondary reinforcement 6 into contact with the bottom 561 and the flank 562 of the groove 56, as well as into contact with the right end of the bottom 51 of the main reinforcement 5. The angle formed by the flanks 563 and the shoulder or step 65 is between 160° and 180°. The arrangement of the reinforcements 5 and 6 thus allows a cell 8 to be formed. The segments of the cell 8 are formed by the side wall 53, the bottom 51, the flank 563 the shoulder or step 65 and the bottom 61. Thus, the cell 8 consists of five segments, of which two first segments are substantially transverse to the bottom 51 of the main reinforcement 5, the angle formed by the bottom 51 and said first segments being between 80° and 120°, and two other segments, which are substantially perpendicular to the first ones, are generally parallel to the bottom 51.

According to a variant of this embodiment, the flank 563 and the shoulder or step 65 substantially only form a single segment because the reinforcements 5 and 6 are fixed to each other, the groove 56 and the shoulder or step 65 cannot move independently one from the other, and the angle formed by the flank 563 and the shoulder or step 65 is substantially flat, because the deflection of the segments formed by the flank 563 and the shoulder or step 65 is less than 10% (when the angle between the flank 563 and the shoulder or step 65 is close to 180°). This embodiment is an alternative to the embodiment shown in FIG. 5, which allows creating a single cell offset to one side making the bodywork beam 1 dissymmetrical, while reinforcing the side without cell.

The beam 1 can be made of metal such as steel, of a plastic that lightens the structure while maintaining its resistance, or of any other material known to the person skilled in the art, capable of providing the necessary resistance to said beam 1.

The outer panel 2, the inner panel 3 and the reinforcements 5, 6, 60a, 60b can be made by folding in a press, stamping, or by successive folds of metal plates, for example of steel, whose thickness may vary between 0.2 mm and 3 mm. The outer panel 2, the inner panel 3 and the reinforcements 5, 6, 60a, 60b can be made, for example, by extrusion of plastic pellets with screw-thread cutters that give the desired shape.

The depth of the grooves 56, 64, 640a and 640b is between 8 mm and 50 mm. Thus, the cells have a height between 8 mm and 100 mm.

The advantage provided by the structure of the bodywork beam 1, as described by the invention, is that it has cells with at least two segments that are in the direction of the compressive force created in the collision of a vehicle with an object, typically with another vehicle, and at least two other segments that are oriented in the direction of bending induced by the compressive force. Since the compressive force is applied transversely with respect to the bottom 51 of the main reinforcement 5, the segments oriented in the direction of the compressive force are therefore transverse to the bottom 51. Since the bending induced by the compressive force is transverse to the direction of this force, the segments that are oriented in the direction of the bending are, therefore, transverse to the segments oriented in the direction of the compressive force.

Obviously, the present invention is not limited to the embodiments described above, but extends to every variant within its scope. Indeed, the geometry of the outer panel 2 and of the inner panel 3 is variable and is not limited to the hat-like shape given in these embodiments. In addition, the outer panel 2 and the inner panel 3 are not limited to symmetrical shapes with respect to a longitudinal plane XX represented in FIG. 1. In addition, the side walls 52 and 53 of the main reinforcement 5 may very well be of different lengths, thus, also making the flanges 54 and 55 noncoplanar. Additionally, transitions (such as grooves) can be carried out on the side walls 52 and 53, as well as on the side walls 62 and 63.

The ratio of the height between the highest side wall of the main or secondary reinforcement having the highest side wall, and the segments substantially transverse to the bottom 51 of the main reinforcement 5, is between 0.1 and 1.

The ratio of the width of the bottom of the main or secondary reinforcement having the longest bottom, and the segments parallel to the bottom 51 of the main reinforcement 5, is between 0.20 and 1.

The ratio of the thickness between the main reinforcement 5 and the reinforcements 6, 60a, 60b is between 0.3 and 3. Preferably, the reinforcements 6, 60a and 60b are placed outside (above) the main reinforcement 5 when thicker than the main reinforcement 5 and conversely they are placed inside (below) the main reinforcement 5 when they are thinner than the main reinforcement 5. In addition, the secondary reinforcements 6, 60a, 60b may be of different thicknesses.

In addition, the main reinforcement 5, and at least one secondary reinforcement 6, 60a, 60b, can be made of different materials.

The secondary reinforcements 6, 60a, 60b do not necessarily run the entire length of the beam 1. In addition, along the beam 1, there may be a different number of secondary reinforcements 6, 60a, 60b, which may be of different shapes. There may also be a secondary reinforcement 6, 60a, 60b whose shape is variable along the beam 1.

Advantageously, the areas of lower resistance, or soft areas, can be made along the beam 1, for example, differences in the thermal treatment of areas of the main reinforcements 5 or secondary reinforcements 6, 60a, 60b during their shaping, for example by stamping. The presence of these soft areas allows ensuring the deformation of the beam 1 in accordance with the safest mode for passengers during a collision between several vehicles.

In a further embodiment of the invention shown in FIG. 14, the segments 71 and 82 of the cells 7 and 8 comprise, respectively, a groove 10 and a shoulder or step 11. This groove 10 or shoulder or step 11 increases the resistance of the segments 71 and 82 by increasing the number of segments oriented in the direction of the compression created by a collision between vehicles and to increase the number of segments oriented in the direction of the bending induced by this compression.

Furthermore, the invention is not limited to the particular embodiments described above. It includes, in particular, any possible combination of the embodiment variants of the invention as described and illustrated in the accompanying figures.

Figure 18:
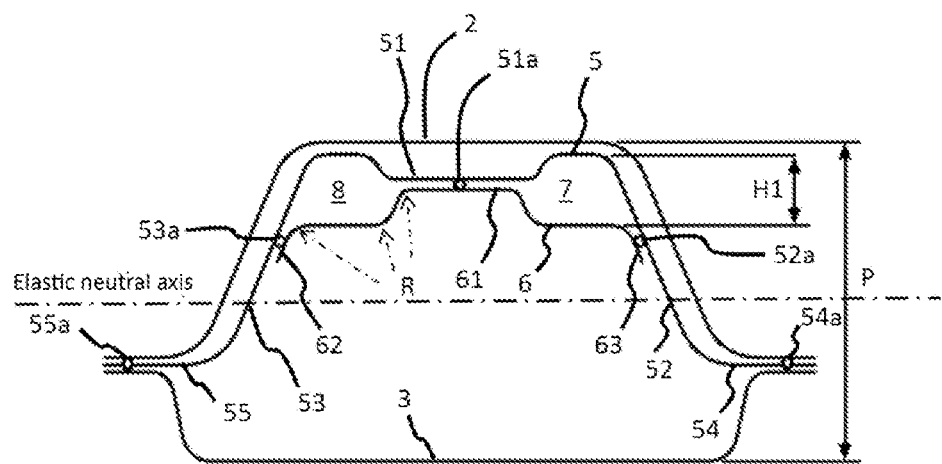
FIG. 18 shows a schematic cross-sectional view of the basic features of the invention.

FIG. 18 illustrates some of the basic features of the invention. In FIG. 18 a beam formed by assembling a outer panel 2, an inner panel 3, a main reinforcement 5 and a secondary reinforcement 6, and which has two cells 7 and 8 conforming to the definition given in the accompanying appended independent claim, can be found. In 52a and 53a in FIG. 18, a welded joint is schematically illustrated, for example by laser welding, between the side walls 52, 53 of the main reinforcement 5 and the side walls 62, 63 of the secondary reinforcement 6. In 54a and 55a a welded connection between the flanges 54, 55 of the main reinforcement 5 and adjacent flanges of the outer panel 2 and inner panel 3 is illustrated. In FIG. 18, with the reference 51a, a contact made between the bottom 51 of the main reinforcement 5 and the bottom 61 of the secondary reinforcement 6 is also illustrated. The main reinforcement 5 and the secondary reinforcement 6 can be assembled at the level of contact 51a, for example by laser welding, or the principal reinforcement 5 and the secondary reinforcement 6 can only be in contact at the contact 51a level without being assembled at the level of said contact 51a.

Figure 19:
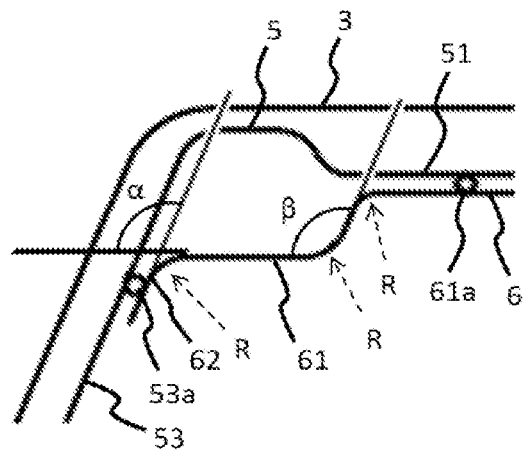
FIG. 19 shows a schematic detailed view of a cell shown in cross-section in FIG. 18, so as to represent the basic features of the invention, FIG. 20 schematically shows, in a similar manner, the basic features of the invention on a cross-sectional view of a beam according to another variant.

In FIG. 19, the angle formed by the non-ribbed portion of the bottom 61 of the secondary reinforcement 6 and the flange 62 of the secondary reinforcement 6 is referenced α. The angle α is between 80° and 120° and preferably between 93° and 110°. Moreover, the angle of inclination of the rib flanks of the bottom 61 of the secondary reinforcement 6, that is to say, the angle formed by the non-ribbed portion of the bottom 61 and a flank of said rib is referenced β. The angle β formed by the bottom 61 of the secondary reinforcement 6 is between 80° and 120° and preferably between 93° and 110°. In addition, as indicated above according to the invention, preferably, each side wall 52, 53 of the main reinforcement 5 forms with the bottom 51 an angle between 80° and 120°.

As can be seen in FIG. 18, and as can be seen in FIG. 19, the radii R of the transition angles between two adjacent segments are less than 10 mm, for both the main reinforcement 5 and for the secondary reinforcement 6. This feature allows obtaining a better compromise between the mass of the bodywork beam 1 and the bending and compressive resistance of said beam 1. Indeed, the transition angles between adjacent segments are preferably in circular arc (for concentration purposes and for manufacturing process purposes), and the effect of promoting low radii R transition angles allows to maximize the effective linear segments aligned vis-a-vis the pressures in compression and/or bending.

On examination of FIG. 18 it is observed that preferably the height H1 of the cells 7, 8, seen perpendicularly to the bottom 51, is preferably less than or equal to one third of the total depth P of the beam. This feature allows obtaining a better compromise between the increase in the mass of the bodywork beam 1 and the increase of the resistance to the bending and compression of said beam 1. Preferably these cells are positioned in the area that will work in compression, for example in connection with a bending of the bodywork beam 1 (elastic neutral axis which defines the area subjected to compression and the area subject to tensile stress, at the level of the center of gravity of the beam 1, see FIGS. 1 and 18). Thus, to maximize the ratio of resistance to bending/mass it is necessary to maximally separate the material of the elastic neutral axis since the material which is close to the elastic neutral axis is less subject to tensile stress or compression upon bending of the beam 1.

Figure 20:
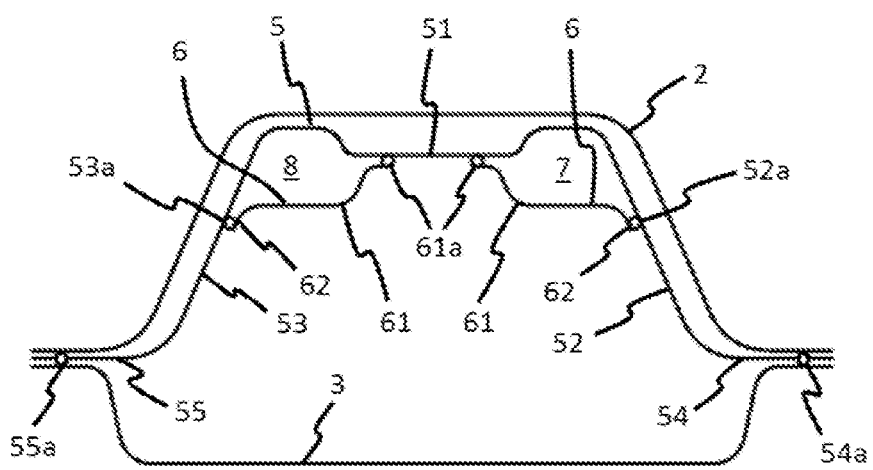

FIG. 20 shows a view similar to FIG. 18, illustrating a variant of the invention for which the bodywork beam 1 comprises two L-shaped secondary reinforcements 6, each of which comprises a bottom 61 and a side wall 62. Secondary reinforcements 61 are assembled to the main reinforcement 5 through contacts 61a, 52a and 53a. More specifically, the secondary reinforcements 6 comprise side walls 62 of less length, so as to limit the increase in the mass of the bodywork beam 1. A first secondary reinforcement 6 is assembled to the main reinforcement 5 by a lap weld between its side wall 62 and the side wall 53 of the main reinforcement at the contact 53a, and by a weld between its bottom 61 and the bottom 51 of the main reinforcement 5 to a first contact 61a. A second secondary reinforcement 6 is assembled to the main reinforcement 5 by a lap weld between its side wall 62 and the side wall 52 of the main reinforcement at the contact 52a, and by a weld between its bottom 61 and the bottom 51 of the main reinforcement 5 to a second contact 61*a*. In this variant, the main reinforcement 5 is also assembled to the outer panel 2 and to the inner panel 3 at contacts 55*a* and 54*a* at the level of its flanges 54 and 55.

Figure 21:
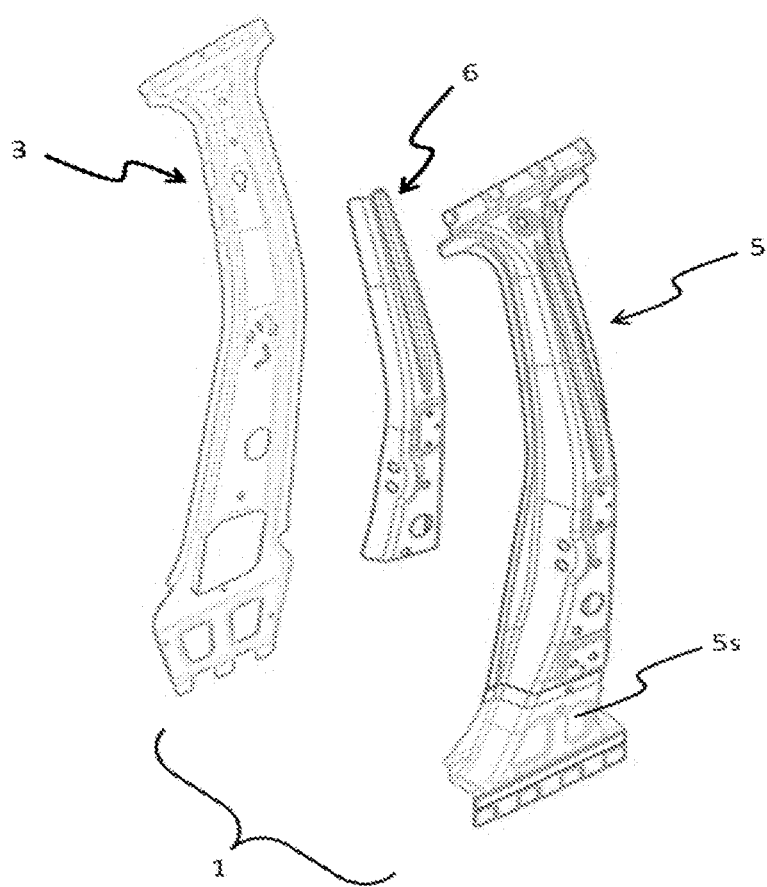
FIG. 21 shows an exploded perspective view of a beam, according to the present invention, formed by the assembly of a main reinforcement, a secondary reinforcement and an inner panel.

In FIG. 21, an exploded view of a bodywork beam 1 formed by the after assembly combination of a main reinforcement 5, a secondary reinforcement 6 and an inner panel 3, is represented. FIG. 21 shows schematically in 5*s* an area of the main reinforcement 5 having a lower mechanical resistance than the rest of the length of the beam 1 following an appropriate heat treatment to control the mechanical properties of this part and notably controlling its deformation under pressure.

As illustrated in FIG. 22, the beam, according to the invention, may also have a section which changes along its length.

FIG. 22 illustrates five successive sections of the bodywork beam 1 and shows the change in section. In particular, the changes in geometry of the cells for controlling the areas where it is desired to favor stiffness, according to the invention, are observed.

The invention claimed is:

1. A B-pillar for a motor vehicle bodywork, the B-pillar having a longitudinal direction, comprising:
   a main reinforcement having a substantially U-shaped cross-section including a bottom, two side walls forming an angle between 80° and 120° with the bottom of the main reinforcement, and two flanges substantially parallel to the bottom, the two flanges being inclined with respect to the bottom at a maximum angle of 10°;
   at least one secondary reinforcement having a bottom and at least one side wall forming an angle between 80° and 120° with the bottom of the secondary reinforcement, wherein the at least one secondary reinforcement is fixed to the main reinforcement;
   an assembly of the main reinforcement and the at least one secondary reinforcement, comprising:
   the main reinforcement and the at least one secondary reinforcement being fixed to each other at each of their respective side walls, and
   the bottom of the main reinforcement and the bottom of the secondary reinforcement having a transition, such that at least a portion of the bottom of the secondary reinforcement is in contact with a portion of the bottom of the main reinforcement,
   wherein
   at least one closed cell is formed by the assembly of the main reinforcement and the at least one secondary reinforcement, the closed cell comprising four linear segments formed by segments of the side walls and segments of the bottoms of the main reinforcement and the secondary reinforcement, wherein two first segments of the four segments are oriented transversely to the bottom of the main reinforcement, and the other two segments of the four segments form an angle between 80° and 120° to the two first segments,
   the bottom of the main reinforcement has a rib, and the at least one secondary reinforcement has a bottom with a groove, wherein the rib of the main reinforcement is connected to the groove of the secondary reinforcement, and
   the rib of the main reinforcement and the groove of the at least one secondary reinforcement are inclined with respect to the bottom of the main reinforcement.

2. The B-pillar according to claim 1, comprising a first secondary reinforcement and a second secondary reinforcement, wherein the first secondary reinforcement is fixed at each of its side walls to a corresponding sidewall of the main reinforcement, and wherein the second secondary reinforcement is fixed at each of its side walls to a corresponding sidewall of the first secondary reinforcement.

3. The B-pillar according to claim 1, wherein the rib of the bottom of the main reinforcement is located at a center of the bottom of the main reinforcement.

4. The B-pillar according to claim 1, wherein the main reinforcement is arranged inside the U-shape of at least one secondary reinforcement.

5. The B-pillar according to claim 1, wherein the at least one secondary reinforcement is arranged inside the U-shape of the main reinforcement.

6. The B-pillar according to claim 1, wherein at least one secondary reinforcement has a substantially U-shaped cross-section having a bottom and two sidewalls.

7. The B-pillar according to claim 1, wherein the at least one cell formed by the assembly of the main reinforcement and the at least one secondary reinforcement has a height between 8 mm and 100 mm.

8. The B-pillar according to claim 3, wherein the rib of the main reinforcement and the groove of the at least one secondary reinforcement have a depth between 8 mm et 50 mm.

9. The B-pillar according to claim 1, wherein at least one of the segments has a groove or a shoulder or a step.

10. The B-pillar according to claim 1, wherein a height of each cell as measured perpendicularly to the bottom of the main reinforcement is less than or equal to one third of a depth of the B-pillar.

11. The B-pillar according to claim 1, wherein radii of a transition angle between two of the linear segments that are adjacent are less than 10 mm and have a size smaller than that of the adjacent segments.

12. A B-pillar for a motor vehicle bodywork, the B-pillar having a longitudinal direction, comprising:
   a main reinforcement having a substantially U-shaped cross-section including a bottom, two side walls forming an angle between 80° and 120° with the bottom of the main reinforcement, and two flanges substantially parallel to the bottom, the two flanges being inclined with respect to the bottom at a maximum angle of 10°;
   at least one secondary reinforcement having a bottom and at least one side wall forming an angle between 80° and 120° with the bottom of the secondary reinforcement, wherein the at least one secondary reinforcement is fixed to the main reinforcement;
   an assembly of the main reinforcement and the at least one secondary reinforcement, comprising:
   the main reinforcement and the at least one secondary reinforcement being fixed to each other at each of their respective side walls, and
   the bottom of the main reinforcement and the bottom of the secondary reinforcement having a transition, such that at least a portion of the bottom of the secondary reinforcement is in contact with a portion of the bottom of the main reinforcement,
   wherein
   at least one closed cell is formed by the assembly of the main reinforcement and the at least one secondary reinforcement, the closed cell comprising four linear segments formed by segments of the side walls and segments of the bottoms of the main reinforcement and the secondary reinforcement, wherein two first segments of the four segments are oriented transversely to the bottom of the main reinforcement, and the other two segments of the four segments form an angle between 80° and 120° to the two first segments, and at least one secondary reinforcement has a substantially L-shaped cross-section having a bottom and only a single sidewall.

* * * * *